(No Model.)
S. MAXIM.
BRUSH EXTRACTOR.
No. 355,460. Patented Jan. 4, 1887.
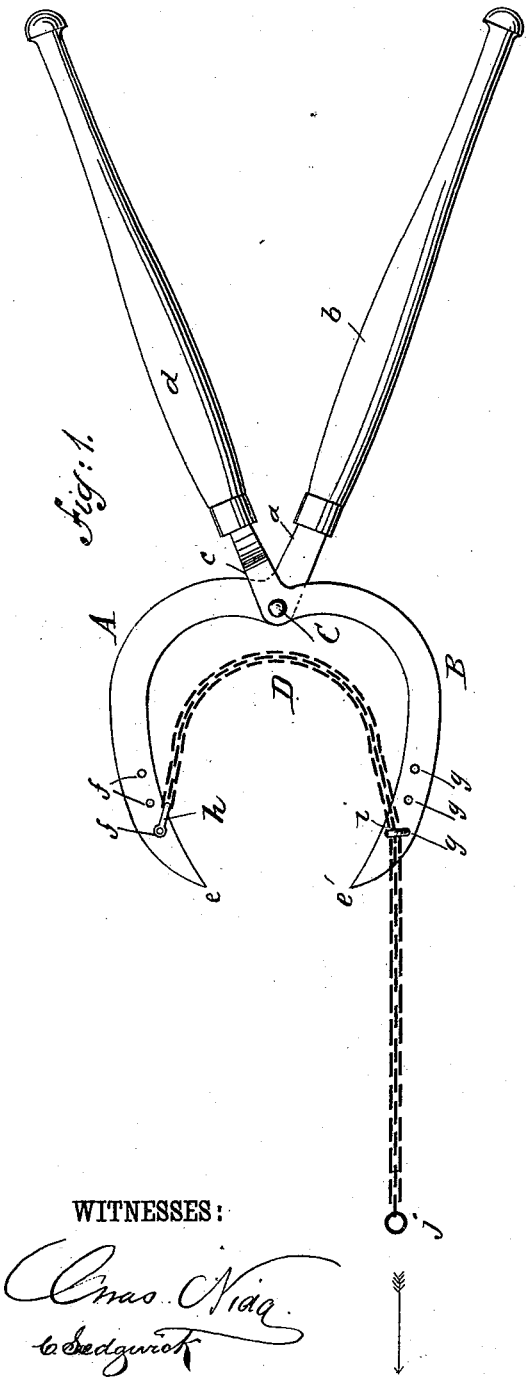
WITNESSES:
INVENTOR:
S. Maxim
BY Munn & Co.
ATTORNEYS.

UNITED STATES PATENT OFFICE.

SAMUEL MAXIM, OF WAYNE, MAINE.

BRUSH-EXTRACTOR.

SPECIFICATION forming part of Letters Patent No. 355,460, dated January 4, 1887.

Application filed October 20, 1886. Serial No. 216,725. (No model.)

*To all whom it may concern:*

Be it known that I, SAMUEL MAXIM, of Wayne, in the county of Kennebec and State of Maine, have invented a new and Improved Brush-Extractor, of which the following is a specification, reference being had to the annexed drawings, forming a part thereof, in which—

Figure 1 is a side elevation of my improved brush-extractor, and Fig. 2 is an edge view.

Similar letters of reference indicate corresponding parts in both views.

The object of my invention is to provide a simple and effective device for extracting brush or clumps of bushes by means of animal-power.

My invention consists in a pair of forcep-jaws provided with suitable handles, and having a chain attached to one of the jaws, near the point thereof, and extending through an eye projecting from the opposite jaw, near its point, for partly encircling the bushes and binding them tightly in the points of the forceps, all as hereinafter more fully described.

The curved jaws A B are oppositely arranged with respect to each other and connected pivotally by the rivet or bolt C. The shank $a$ of the jaw A is straight, and is provided with a wooden handle, $b$. The shank $c$ of the jaw B is offset, so that it may carry the handle $d$, attached thereto above the handle $b$. The jaws A B are provided with pointed extremities $e\ e'$, and with apertures $f\ g$. A clevis, $h$, is secured to the jaw A by a bolt passing through one of the apertures, $f$. A chain, D, secured to the clevis $h$, extends through an eye, $i$, secured in one of the apertures, $g$, of the jaw B. The free extremity of the chain D is provided with a ring, $j$, for the attachment of a team.

My improved brush-extractor is applied to the brush to be pulled by grasping the brush near the ground between the jaws A B, the chain D being thrown back toward the pivot of the jaws, as shown in Fig. 1. The further movement of the team attached to the chain D draws the brush toward the points of the jaws, and at the same time draws the jaws toward each other, so as to tightly embrace the brush. A still further movement of the team will remove the brush from the ground.

Should it be found difficult to start the brush by the engagement of the chain and jaws with the trunks alone, the jaws may be tilted, so as to cause their points to enter the ground around the roots of the brush, and the team will be made to pull in the opposite direction.

Having thus fully described my invention, I claim as new and desire to secure by Letters Patent—

1. In a brush-extractor, the combination, with the curved, pointed, and apertured jaws A B, pivoted to each other and provided with handles $b\ d$, of the chain D, attached to the jaw A, extending through an eye, $i$, secured to the jaw B, substantially as described.

2. In a brush-extractor, the combination of the jaw A, provided with a straight shank, $a$, and handle $b$, the jaw B, provided with the offset shank $c$ and handle $d$, and the chain D, connected with the jaw A, and extending through an eye, $i$, attached to the jaw B, substantially as described.

SAMUEL MAXIM.

Witnesses:
BELA R. REYNOLDS,
BENJ. F. SLEEPER.